United States Patent [19]

Holland

[11] 3,800,963
[45] Apr. 2, 1974

[54] MATERIAL STORAGE AND HANDLING SYSTEM

[76] Inventor: Edward T. Holland, P.O. Box 1446, Lancaster, Pa.

[22] Filed: Dec. 4, 1972

[21] Appl. No.: 311,757

[52] U.S. Cl. ... 214/16.4 A, 191/12.2 R, 214/16.4 B, 214/16.4 C
[51] Int. Cl. ............................................. B65g 1/04
[58] Field of Search ..... 214/16.4 A, 16.4 B, 16.4 C, 214/16 B; 191/12.2 R

[56] References Cited
UNITED STATES PATENTS

| | | | |
|---|---|---|---|
| 2,647,647 | 8/1953 | Alimanestiano | 214/730 X |
| 3,417,879 | 12/1968 | Gough | 214/16 B |
| 3,430,308 | 3/1969 | Von Alsburg | 214/16.4 R |
| 3,709,383 | 1/1973 | Jennings et al | 214/16.4 B X |

FOREIGN PATENTS OR APPLICATIONS

| | | | |
|---|---|---|---|
| 262,893 | 6/1968 | Austria | 214/16.4 B |
| 382,975 | 12/1964 | Switzerland | 214/16.1 CC |

*Primary Examiner*—Robert J. Spar
*Assistant Examiner*—R. B. Johnson
*Attorney, Agent, or Firm*—James C. Nemmers; Haven E. Simmons

[57] ABSTRACT

A transportation system for load-carrying pallets which are stored in multiple-tier, multiple-lane storage racks. The system includes a host vehicle, which is a specially designed stacker crane that operates along an aisle adjacent the work faces of the racks. The host vehicle has a vertical elevator that carries a pallet transporting carrier which is used to deposit, move or retrieve a pallet from any storage lane or tier in the rack. The carrier is powered and remotely controlled by the operator of the host vehicle through a control-power belt interconnecting the host vehicle and the carrier. With the system, a single host machine and a single pallet carrier can service the entire storage area from a single aisle.

14 Claims, 13 Drawing Figures

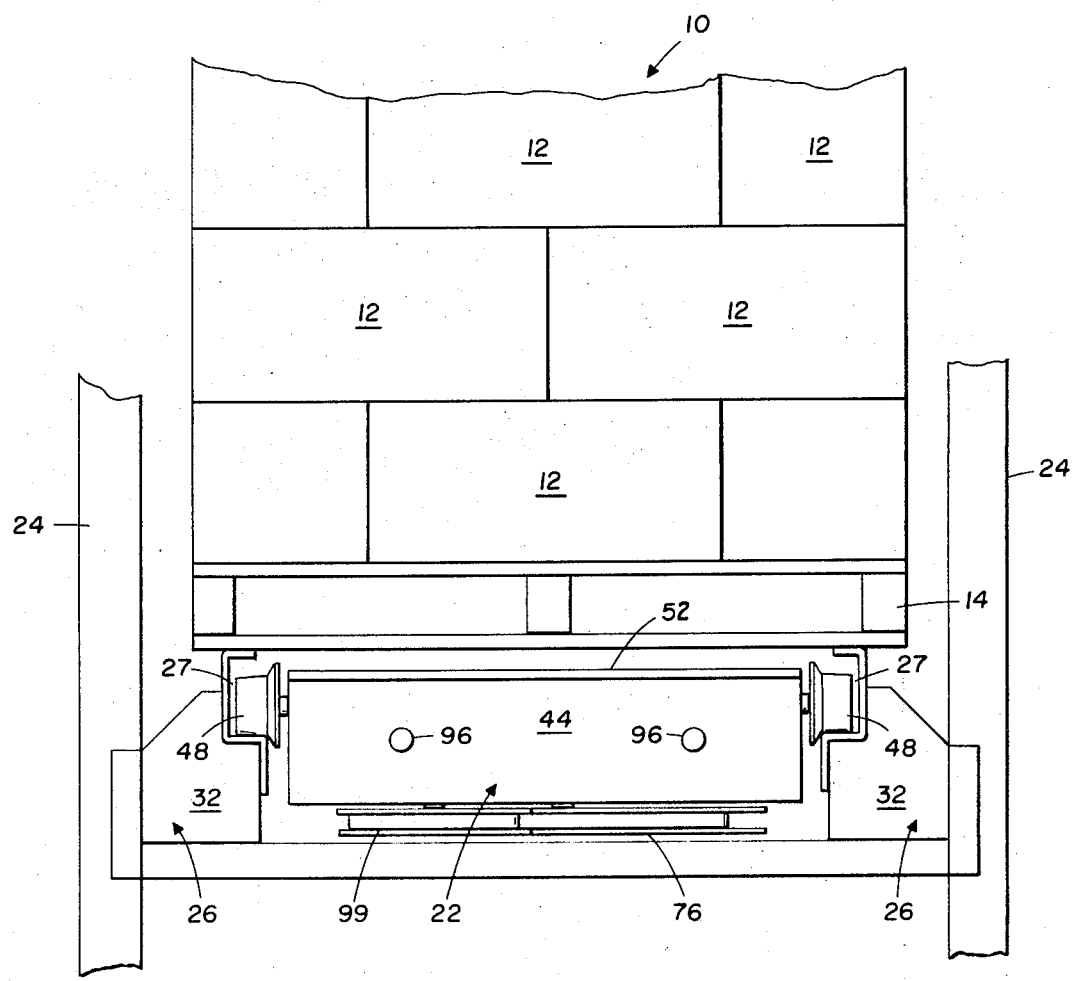

MATERIAL STORAGE AND HANDLING SYSTEM

BACKGROUND OF THE INVENTION

With today's marketing emphasis on packaging a product for maximum consumer appeal rather than maximum protection of the product, a considerable number of products are packaged in a manner that does not provide the product with sufficient support to permit high stacking of the products. Moreover, the economics of storage space favors the construction of high ceiling warehouses to facilitate storage in multiple tiers. In order to achieve storage efficiency, high rise storage and automated load transportation systems have been developed and used employing multiple-tier storage racks. In such systems, the products are supported on a pallet which in turn is stored in one of the storage lanes and at one of the tier levels. These high rise storage systems result in tremendous savings in floor space and allow fragile or easily curshable products to be efficiently handled. In addition, such systems have become automated to varying degrees through the use of storage and retrieval machines operating in aisles along the work faces of the storage racks. The storage and retrieval machines have taken a number of forms, from simple pallet carrying fork trucks to rather complex remote control stacker cranes using shuttle cars, transfer tables and interconnected networks of conveyors. A wide variety of such systems employing different types of storage racks and using different types of storage and retrieval machines are well known to those in the materials handling field. While all of these prior art systems contribute greatly to storage efficiency, they do so at the expense of handling efficiency. There have been attempts to improve the handling efficiency in such systems by employing individual carrier vehicles operating within each address of the storage rack. Although such systems greatly improve handling efficiency, they greatly increase the cost of a given system because of the number of carrier vehicles required and extensive power supply systems. In the prior art systems using these powered carrier vehicles, each carrier vehicle must be connected to a source of electrical power. This could be a battery for each vehicle or a central power source with the power being fed to each vehicle by means of a power rail located in and along the entire pathway of each vehicle. Even if a single carrier vehicle is used and moved from address to address within the storage racks, power rails within each address must be provided or the carrier must be battery powered. The use of batteries, particularly in cold storage areas, is not practical at this time and the use of power rails adds greatly to the cost of the system. Other prior art systems use a storage-retrieval machine employing a shuttle table attached to the machine and movable vertically and horizontally to each side of the machine. Such systems allow a pallet load to be carried and deposited at any selected face along an aisle between racks, but retrieval of a load can only be accomplished by the shuttle table to a depth of one or two loads on each side of the aisle. Such systems, therefore, require numerous aisles resulting in a loss of storage efficiency. The prior art systems thus have not only design limitations but also limitations as to the type of product which can be handled. There is, therefore, a need for a pallet transporting system which has flexibility, both storage and handling efficiency, but without the greatly increased cost of the multiple carrier vehicle systems.

SUMMARY OF THE INVENTION

The invention employs a host vehicle that operates along an aisle, the host vehicle carrying on a vertical carriage a single pallet transporting carrier interconnected to it by a control-power belt. The host vehicle moves horizontally along the aisle, and with the vertically movable carriage carrying the pallet carrier, the carrier can be positioned directly opposite any face of the storage rack on either side of the aisle. The pallet carrier can move along an address on either side of the hose machine, the carrier being powered and controlled through the belt interconnecting it with the host machine. The pallet transporting carrier can, therefore, deposit, move or retrieve pallets to any depth in either direction from the aisle, the depth being limited only by the length of the control-power belt. Thus, when a single carrier vehicle, a pallet load can be deposited or retrieved from any tier in any lane of the storage rack wthout regard to the storage in the other tiers of that lane. This results in greatly increased storage efficiency at least equal to that of any known system without sacrificing handling efficiency or flexibility. Using a system employing the principles of the invention, this increased storage and handling efficiency is achieved with very little increase in cost and in some cases a reduction in cost over existing and known systems.

Many additional features and advantages of the invention will be evident from a review of the description of a preferred embodiment of the invention contained herein.

DESCRIPTION OF THE DRAWINGS

FIG. 4 is an enlarged end view of a single working face and showing the carrier vehicle in the lane;

FIG. 9 is a perspective view of a portion of the control-power belt;

DESCRIPTION OF A PREFERRED EMBODIMENT OF THE INVENTION

Figure 1:
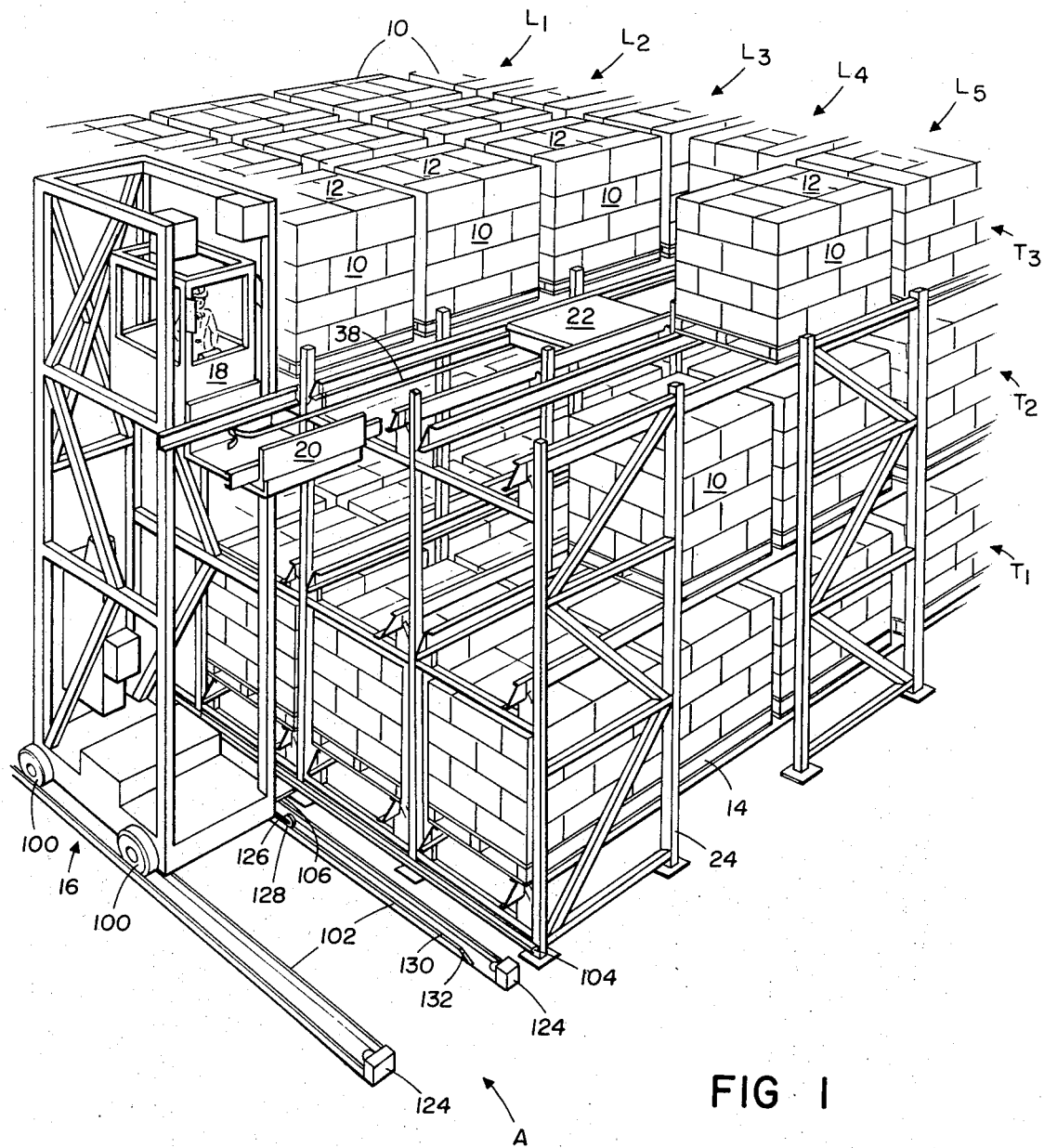
FIG. 1 is a perspective view of a portion of the typical multi-level storage system and showing the host and carrier vehicles of the invention.

Referring to FIG. 1, there is shown a portion of a typical multi-level storage system in which a plurality of pallet loads 10 are stored. The pallet loads 10 are supported by structure frame members generally referred to as storage racks which will be described more fully hereinafter. Each pallet load 10 includes a plurality of product packages 12 supported on a typical shipping pallet 14. As illustrated in FIG. 1, the pallet loads 10 are stored at multiple levels in tiers T and are stored in adjacent lanes L, there being three tiers, $T_1$, $T_2$ and $T_3$ and five lanes, $L_1$, $L_2$, $L_3 L_4$ and $L_5$ in the rack shown. A particular tier T in a particular lane L presents a working face F (FIG. 2) along an aisle A which may have a plurality of working faces F on each side thereof or only on one side thereof. Movable forwardly and backwardly along the aisle A is a "mother" or host storage and retrieval machine indicated generally by the reference numeral 16. The host machine 16 is specially designed to receive a carrier platform 20 on its vertically movable carriage 18 which platform 20 carries the pallet transporting vehicle or carrier indicated generally by the reference numeral 22.

STORAGE RACKS

Figure 3:
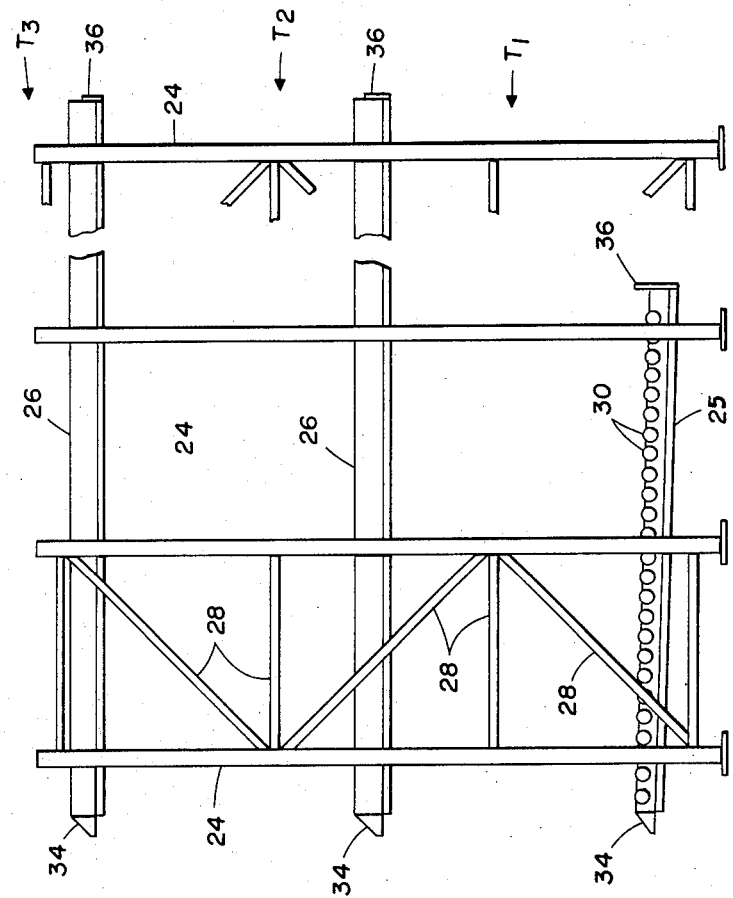
FIG. 3 is a side view of a portion of a typical storage lane and showing a gravity rack in the lowest tier.
Figure 2:
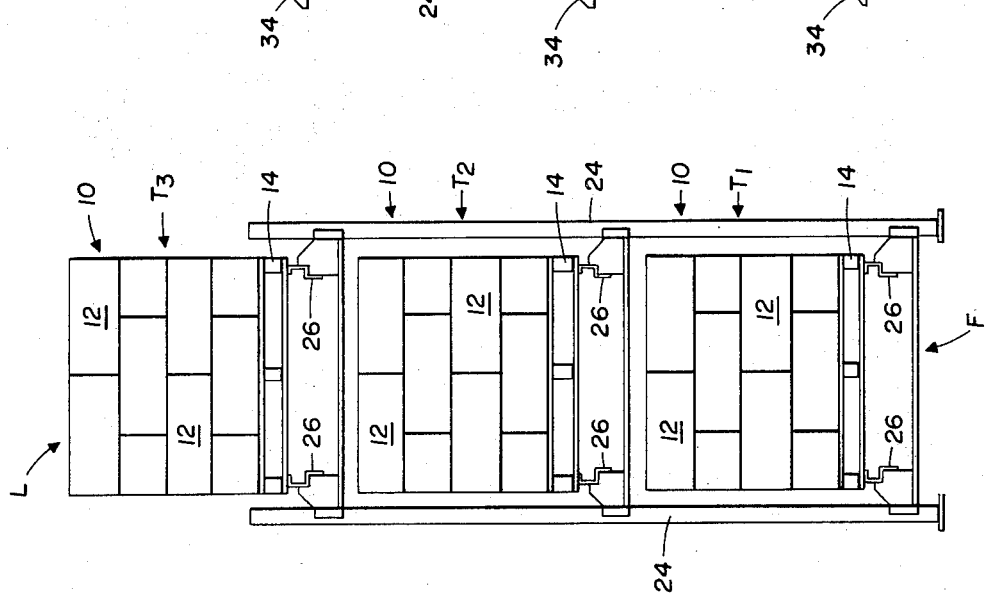
FIG. 2 is an elevational view of the end of a single lane in a typical storage system of the invention.

The storage racks are comprised of a plurality of vertical columns 24 along which are located pairs of horizontal rails 26. The vertical columns 24 and rails 26 are preferably further structurally reinforced by frame members 28. A typical lane L of three tiers T is shown in FIG. 2 from an end view. FIG. 3 illustrates a side elevational view of three tiers T with the lowest tier $T_1$ modified to include rails 25 that are inclined slightly downwardly from the aisle A and which are provided with wheels 30 to allow a pallet load 10 to move under force of gravity from the aisle to the opposite end of the lane L.

Those in the materials handling field commonly refer to a single tier of a single lane of a storage rack as an "address." Along each address there are a plurality of positions in which a pallet load 10 can be located, these positions extending from the aisle A outwardly to a depth depending upon the design and capacity of the particular system.

A pair of spaced-apart parallel rails 26 extend horizontally along the sides of each address, and the pallet loads 10 are supported along the top edges of the rails 26. As best seen in FIG. 4, the rails 26 are channel-shaped members which provide tracks 27 along which the carrier 22 can move. The rails 26, of course, limit the lateral movement of the carrier 22 and thus guide it along a straight path from position to position within a particular address. The rails 26 include suitable supports 32 which are affixed to the vertical columns 24. If desired an entry nose 34 (FIG. 3) may be provided at the aisle end of each rail 26. Also, a stop member 36 may be provided at the end of each rail 26 opposite to the entry or aisle end thereby positively limiting the movement of the carrier 22.

PALLET TRANSPORT VEHICLE OR CARRIER

Figure 5:
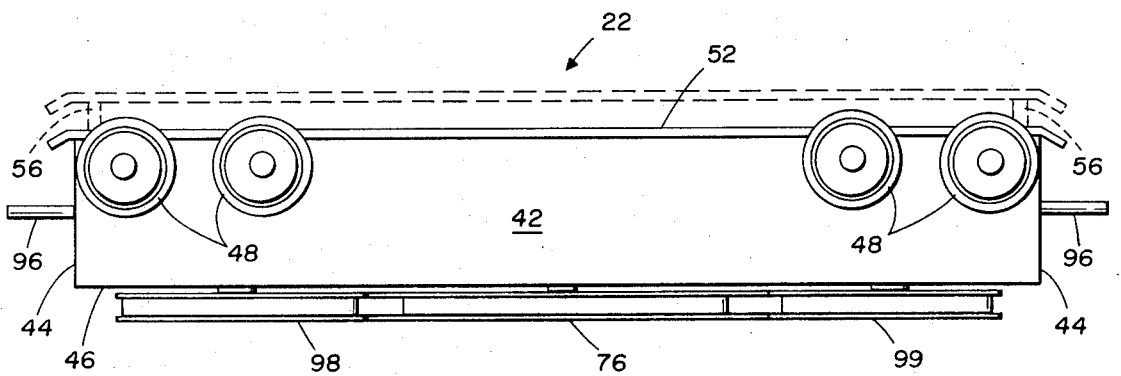
FIG. 5 is a side elevational view of the carrier vehicle.
Figure 6:
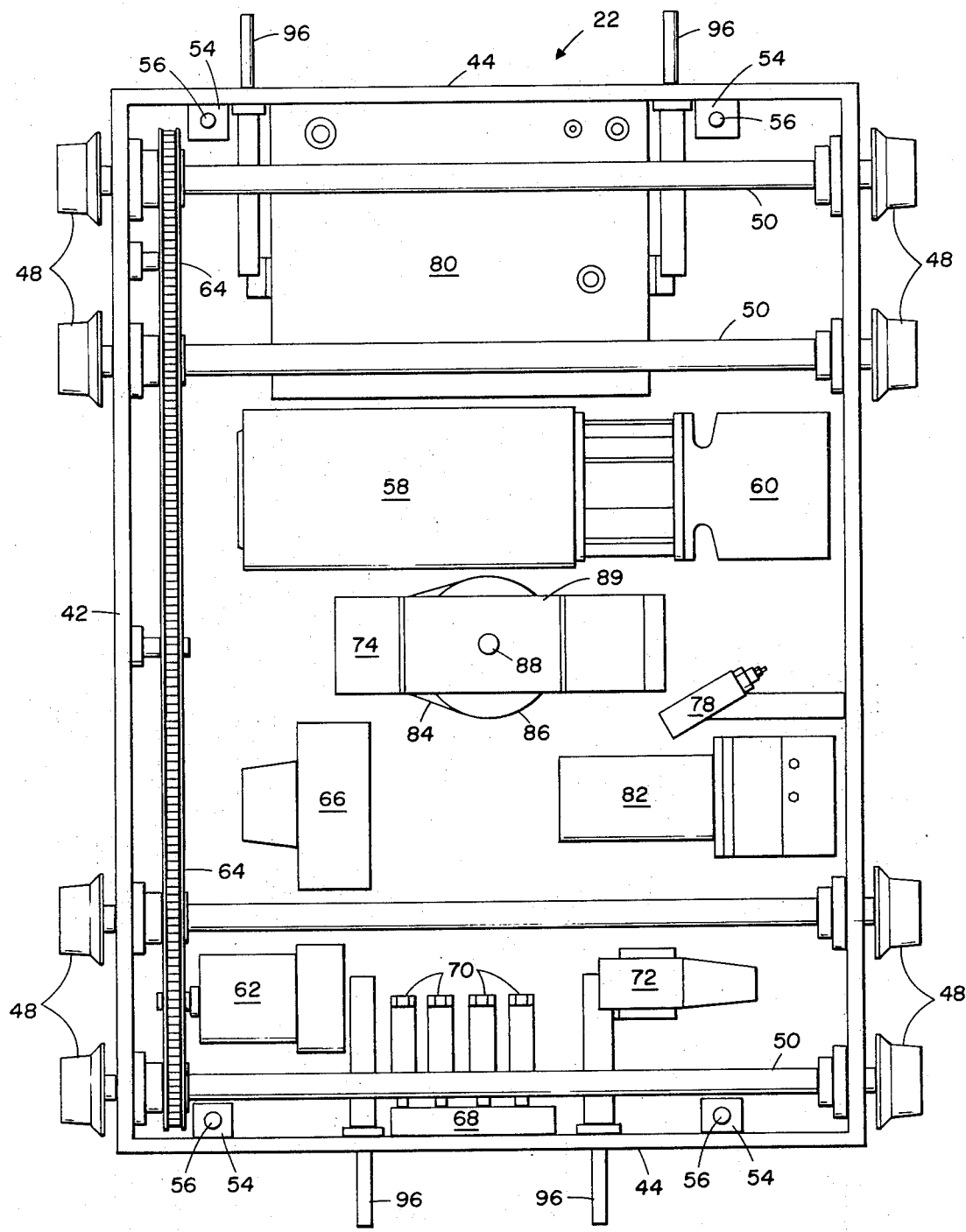
FIG. 6 is a top plan view of the carrier vehicle with the lift cover removed to show the details of the interior of the vehicle.

The pallet transport carrier 22 is a self-contained powered vehicle that is interconnected to the host machine 16 through a power-control belt 38 (FIGS. 1 and 7) which might somewhat descriptively be termed an "umbilical" belt. As best seen in FIGS. 4, 5 and 6, the carrier 22 has a rectangular box-shaped body consisting of side walls 42 joined by end walls 44 and a bottom wall 46. The length and width of the carrier 22 is determined generally by the size of the pallet 14 and the size of the storage racks. The width of the carrier 22 must be such to allow the carrier to travel along the tracks 27 between a pair of rails 26 in each address of the storage rack. In order to minimize the unusable storage space between the tiers T, the height of the carrier 22 preferably is as small as possible but must be sufficient to accommodate all the necessary operating components as more fully described hereinafter. However, modification of the structure of the storage racks to accommodate the carrier 22 increases the height of a tier T only slightly (if at all) because of the necessity of using structural shaped steel of sufficient size to support the pallet loads 10.

The carrier 22 has a plurality of wheels 48 rotatable on shafts 50 which extend through and are supported by the side walls 42. As best seen in FIG. 6, there are a pair of wheels 48 along each side wall 42 near each end wall 44. The spacing of wheels 48 is important as will become evident from the operation of the system more fully described hereinafter.

The top of carrier 22 is covered by a lift plate 52 that is supported by hydraulic cylinders 54 so as to be movable vertically within a limited distance. At its lowest point, lift plate 52 rests on the top edges of the side walls 42 and end walls 44, and as best seen in FIG. 5, is below the level of the top of wheels 48. As indicated by the dotted lines in FIG. 5, in its upper position the lift plate 52 is above the top of wheels 48 and is also above the top edge of rails 26 when the carrier 22 is positioned in a particular address of the storage rack. This, of course, is necessary so that when the lift plate 52 is in its upper position it is capable of lifting a pallet load 10 off the rails 26 so that the load 10 can be moved from one position to another within an address of the storage rack.

Lift plate 52 is supported by the operating rods 56 of four hydraulic cylinders 54, the latter being mounted inside the carrier 22 in each corner with the operating rods 56 extending vertically. A main electric motor 58 is connected to a power source (not shown) through the leads 59 of the control-power belt 38 and drives a variable volume hydraulic pump 60. Pump 60 is of any suitable type which operates under a constant pressure but which will deliver a variable volume of hydraulic fluid to the system in which it is incorporated. The pump 60 is hydraulically connected to a hydraulic motor 62 which is operatively connected to each of the shafts 50 through a chain 64 engaged with sprockets (not shown) on each of the shafts 50 and on the drive or output shaft of the motor 62. Thus, all eight of the wheels 48 are positively driven simultaneously. The importance of this will become evident hereinafter from a description of the operation of the system. The hydraulic pump 60 and hydraulic motor 62 which drives the wheels 48 are interconnected through a main valve 66. Valve 66 is preferably a four-way spool-type valve of the "Moog series 60 type" which uses an electrical torque motor to control movement of the valve spool (not shown). In this type of valve, the position of the valve spool can be controlled remotely by means of an electrical signal. In the system of the invention, this control is by an operator either riding on the host machine 16 or located at a remote location. The signal to the carrier 22 is through the power-control belt 38 which contains a plurality of electrical leads 59, two of which are used to interconnect the main valve 66 with the remote control station.

The variable volume hydraulic pump 60 is also connected through a manifold 68 to four flow regulators 70, one of which is connected to each of the hydraulic cylinders 54. Thus, the operating rods 56 of all four cylinders 54 are raised and lowered simultaneously so that the pallet load 10 is raised and lowered evenly and not tipped. A two-way solenoid controlled valve 72 controls the flow from the variable volume hydraulic pump 60 to the flow regulators 70. Valve 72 is actuated by a control signal received from a remote control station through one of the leads 59 in the control-power belt 38, and thus the operator can easily control the raising and lowering of lift plate 52.

The variable volume hydraulic pump 60 also supplies a hydraulic motor 74 which in turn drives a reel 76 (FIG. 7) upon which the control-power belt 38 is wound. Pump 60 is connected to the motor 74 through a pressure regulator 78. The control-power belt 38 is wound around the reel 76 so as to eliminate any slack in the belt 38 as the carrier 22 moves toward and away from the host machine 16. This is accomplished through the pressure regulator 78, and the use of hydraulics allows a constant pressure to be applied to the reel 76 to always maintain the belt with a minimum of slack regardless of the relative position of carrier 22 and the host machine 16.

Figure 13:
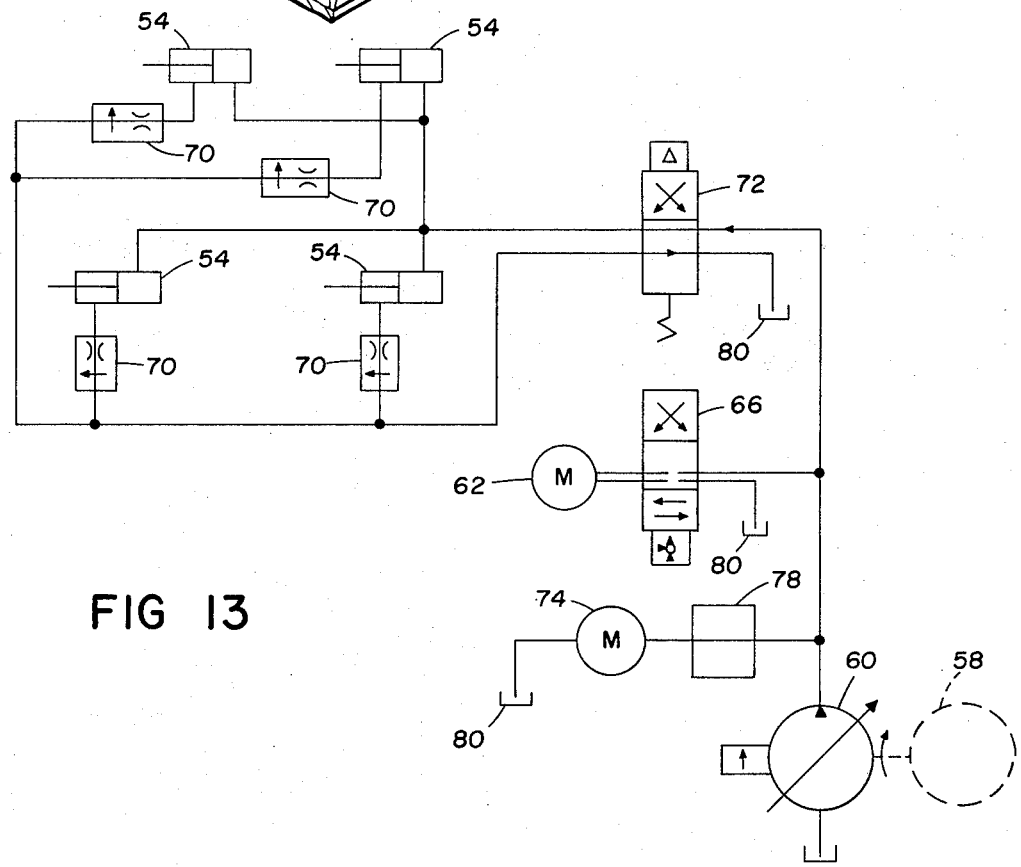
FIG. 13 is a schematic diagram of the hydraulic system of the carrier vehicle.

The hydraulic system or carrier 22, of course, contains a fluid reservoir 80 preferably also contains a filter 82 connected in the return line to the reservoir 80. For the purpose of clarity, the conduits or tubing interconnecting the various components of the hydraulic system of carrier 22 have not been shown in FIG. 6. However, the various components are obviously connected in the manner described and schematically illustrated in FIG. 13.

With the foregoing described hydraulic drive system for the carrier 22, it s obvious that the speed of the wheels 48 are controlled through an infinite number of speeds within the range of 0 to the design maximum of the system. The speed of wheels 48, of course, controls the linear velocity of the carrier 22 which might be designed to have a speed up to 180 feet per minute, for example. With the system described, acceleration and deceleration of the carrier 22 is linear from 0 to the maximum speed thus providing a smoothly operating vehicle with no transitional interruptions that might otherwise jar the pallet load 10. Also, using the hydraulic system described, a carrier 22 can be designed to lift very heavy loads and thus can be used in any known pallet transporting system.

Figure 7:
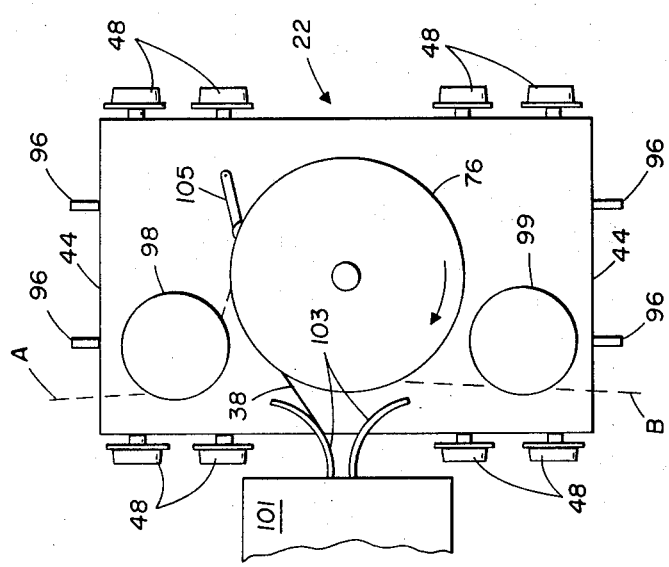
FIG. 7 is a plan view of the bottom of the carrier vehicle and illustrating the retraction system for the power-control belt.

As best seen in FIG. 7, the control-power belt 38 is wound on the reel 76 which is mounted beneath the bottom wall 46 of the carrier 22. The reel 76 is driven by the hydraulic motor 74 (FIG. 6) preferably through a chain 84 interconnecting a sprocket (not shown) on the output shaft of the motor 74 and a sprocket 86 affixed to the shaft 88 of reel 76. Bracket 89 aids in supporting shaft 88 which extends through the bottom wall 46. The control-power belt 38 is preferably a wide, thin belt (see FIG. 9) containing a sufficient number of electrical leads 59 (in this system, nine such leads) to provide the necessary power and control leads from the remote control station to the carrier 22. The belt 38 is preferably covered with a protective covering 91 of suitable material that will resist any abrasive wear incurred through long use.

A pair of idler wheels 98 and 99 mounted on the bottom wall 46 of the carrier 22 aid in properly positioning and directing the belt 38 when the carrier 22 moves in either of the two directions 90° from the host machine 16. When the carrier 22 is closest to the host machine 16 any excess belt 38 may be accumulated in a box 101 (FIG. 7) which is provided with guide plates 103 to assist in properly aligning belt 38 as the carrier moves out away from the host machine 16. The use of the idlers 98 and 99 eliminates the necessity of reversing the direction of rotation of the reel 76. As indicated by the dotted line A in FIG. 7, the belt 38 will be guided by idler 98 on reel 76 when carrier 22 is dispatched to the right of host machine 16, and when dispatched the opposite direction from the host machine 16, idler 99 will guide the belt 38 as indicated by dotted line B. A belt retaining assembly 105 may also be used to keep belt 38 properly wound on reel 76.

Figure 8:
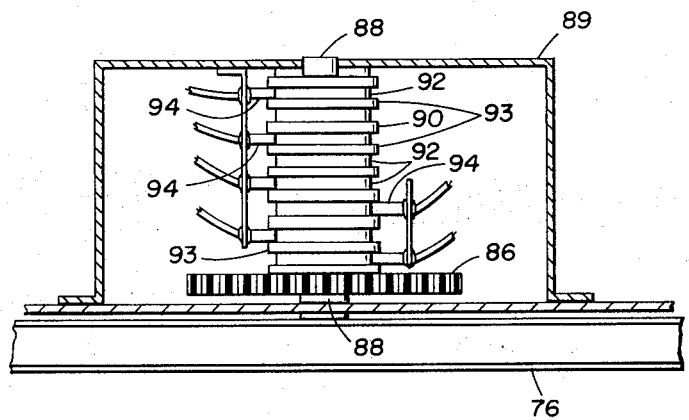
FIG. 8 is an elevational view, partly in section, showing the power reel for the carrier vehicle.

In order to interconnect the leads 59 contained in belt 38 with the various power and control components described herein for the carrier 22, shaft 88 drives an armature 90 (FIG. 8) containing a plurality of annular conductors 92 separated by insulators 93. Each conductor 92 is connected to a respective one of the leads of belt 38 through the center of shaft 88. A plurality of brushes 94 are engaged with armature 90, one of said brushes 94 being engaged with each of the conductors 92. Thus, a continuous supply of electrical energy is supplied through belt 38 from the power source (not shown) in order to provide the power and control signal for carrier 22 as described.

The carrier 22 is also preferably provided with a pair of spring loaded shock absorbers 96 extending from each of the end walls 44. The shock absorbers 96 will minimize any damage should the carrier 22 accidently make contact with another load or against the stops 36 at the end of each address of the storage rack.

HOST MACHINE

Figure 11:
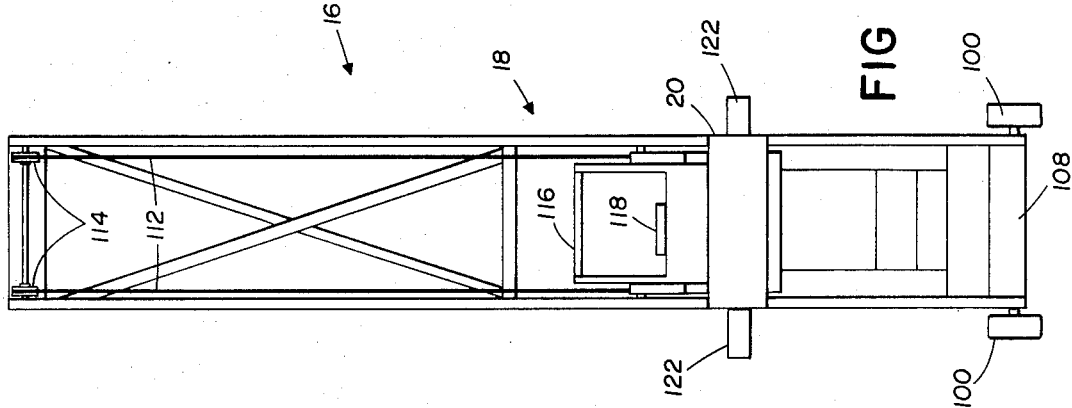
FIG. 11 is a front elevational view of the host machine of FIG. 10.
Figure 10:
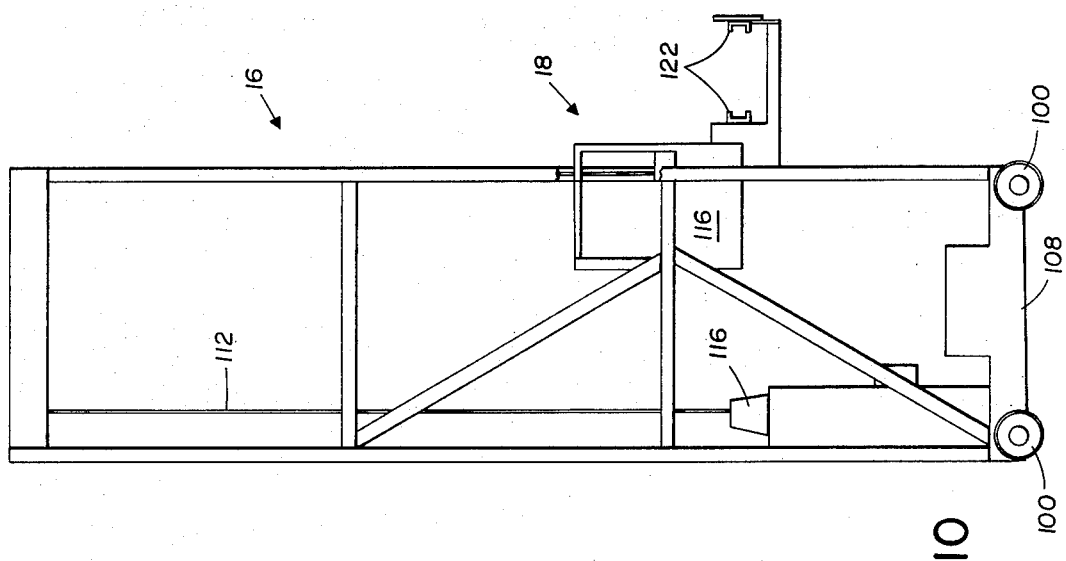
FIG. 10 is a side elevational view of a typical host machine.

For purposes of illustration, there is shown in FIGS. 10 and 11 side and front views, respectively, of a host machine 16 designed to operate according to the invention. The machine 16 is mounted on wheel 100 which move along guide rails 102 affixed to the ground along the aisle A (FIG. 1). Guide rails 102 are preferably structural channels the upstanding legs of which prevent any sideways movement of the host machine 16. Wheels 100 may be beveled, if desired, and are preferably power driven by a hydraulic motor (not shown), the motor being powered by an electric motor that receives its power from an electrical power source (not shown) connected to the power source through a power rail 104 located along the faces of the storage racks just above the aisle A. A suitable contact member 106 secured to the host machine 16 is provided to contiuously engage power rail 104. If desired, rail 104 can be located above the host machine 16 running parallel to aisle A and engaged by a trolley connected to the host machine 16.

The wheels 100 are secured to suitable frame structure 108 which supports the vertically movable carriage 18 by means of cables 112 that are connected around pulleys 114 to a drum 116 also driven preferably by a hydraulic motor (not shown). Similar to the hydraulic system for the carriage 22, the main electrical motor preferably powers a hydraulic pump (not shown) which supplies the fluid pressure for the hydraulic motors to drive both carriage 18 and the wheels 100 of the host machine 16. With the hydraulic system, positive positioning of the platform 20 adjacent entry noses 34 is assured without the rebound reaction when the carrier 22 enters or leaves the platform 20 with a heavy load.

If the host machine 16 is to be controlled by an operator riding on the machine 16 rather than from one at a remote location, the carriage 18 preferably includes an enclosed cab 116 for the operator which cab contains a control panel 118 containing the necessary operating levers, (not shown), to control both the host machine 16 and the carriage 22. If the storage area is refrigerated, the environment within cab 116 should be temperature regulated. The elevator 110 supports platform 20 which extends outwardly from the front of the machine and includes a pair of rails 122 which extend transversely of the direction of movement of the host machine 16. Of course, the size and spacing of rails 122 should be identical to the rails 26 of the storage rack. Also, the length of rails 122 should be just slightly less than the distance between the entry noses 34 of opposite addresses of the storage rack where an aisle runs between two sets of storage racks.

At the ends of rails 102 in aisle A, there are provided stops 124, preferably of the hydraulic type, to cushion the impact if the host machine 16 should inadvertently be driven beyond normal limits. If desired, a control arm 126 can have at its outer end a wheel 128 which rides on a control rail 130 that has a deceleration ramp 132 near the end of each aisle A. The control arm 126 is connected to the control system that regulates the speed of the host machine 16, and has no effect upon the speed of the machine 16 as long as the wheel 128 rides on top of the rail 130. However, if the wheel 128 moves down the deceleration ramp 132, control arm overrides any manual control and reduces the speed of the host machine 16 to the point where the machine 16 merely creeps. This makes the system fail safe and also wear safe because as the wheel 128 wears, the control arm 126 will swing downwardly and thus slow the machine down.

OPERATION OF THE SYSTEM

Figure 12:
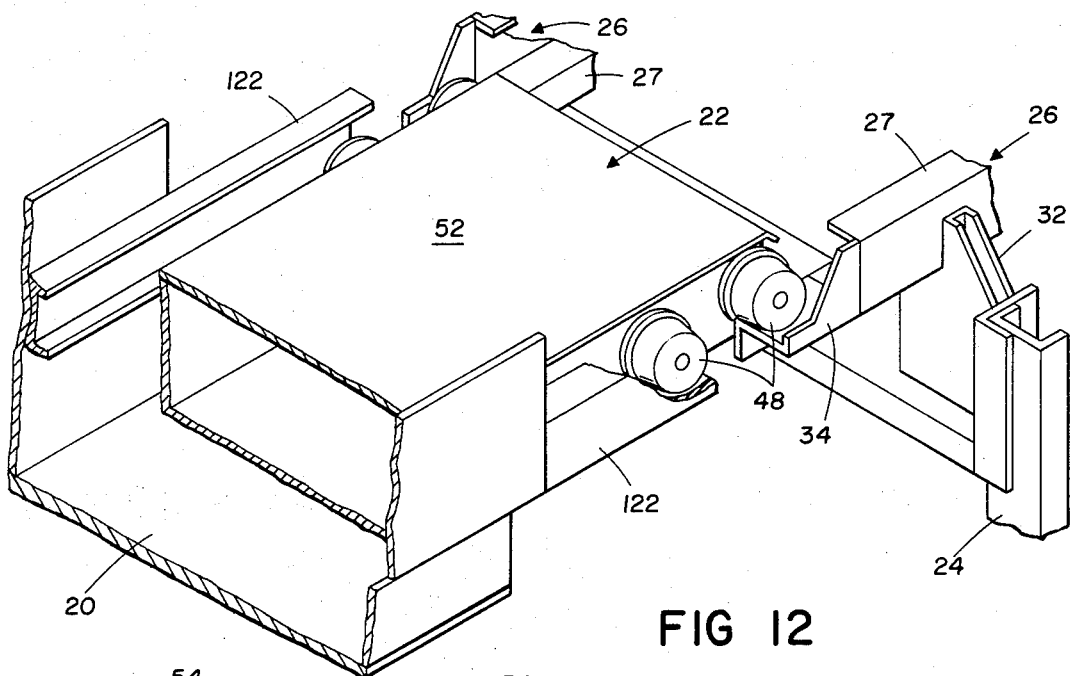
FIG. 12 is a perspective view of a portion of the host machine carriage and a storage rack and showing the transfer of the carrier vehicle from the host machine to the rack.

In the preferred embodiment disclosed herein, the host machine 16 carries the carrier 22 along the aisle A to the desired position with the platform 20 in alignment with the particular lane L at which a pallet load 10 is to be deposited, retrieved or moved. The carriage 18 is moved vertically to the level of the desired tier T until rails 122 on platform 20 are aligned with the entry noses 34, and the carrier 22 is then dispatched either to the right or left of the host machine 16 into the particular address of the rack. Since the racks are not erected to close tolerances, there will be a gap between the ends of rails 122 and the entry noses 34 of the rack. However, a carrier 22 constructed according to the invention is capable of crossing a relatively large gap if it is not in excess of the distance between the shafts 50 for a pair of the drive wheels 48 at one end of the carrier 22. Since all eight of the drive wheels 48 are power driven, the carrier 22 can easily negotiate such gaps without tipping the load being carried (sse FIG. 12).

The design of carrier 22 thus allows considerable tolerance between the position of the host machine 16 and the storage rack. This capability of crossing gaps is also of importance when the carrier 22 is used in a cold storage system where loads are carried through an insulated door, or where the rails 26 of the storage rack may be interrupted by a fire door to permit one area to be sealed air tight from another. Using an electrical-hydraulic drive system for the carrier 22 allows the carrier 22 to be smoothly and rapidly accelerated until it reaches the desired position along the particular address of the storage rack. As the carrier 22 approaches its desired position, the operator can quickly decelerate it. If the carrier 22 is to retrieve a pallet load, it will be positioned directly beneath the pallet load 10 at which time the operator will cause the lift plate 52 to raise to lift the pallet load 10 off the rails 26. By reversing the direction of movement of the carrier 22, the load can be moved onto the platform 20 of the host machine 16 for transfer to another location. Of course, the pallet load 10 can be moved to any other position in a particular address by merely positioning the carrier 22 at that position, lowering the lift plate 52 and removing the carrier 22. During movement of the carrier 22 toward and away from the host machine 16, the control-power belt 38 is automatically let out and retracted so that there is no slack at any time in the belt 38 which would interfere with movement of the carrier 22 in the storage rack.

With the positive control permitted by the system of the invention, it is obvious that the carrier 22 can be dispatched either direction from the host machine 16 to deposit, retrieve or move a pallet load 10 at any position within the storage rack, regardless of the number of lanes or tiers. Also, if sufficient length of belt 38 is provided, there is no limit on the depth to which the carrier 22 can travel within an address.

SAFETY FEATURES

One of the important safety features that can be built into the system is to automatically reduce the speed of carrier 22 to one-half its maximum speed when the lift plate 52 is raised. This is accomplished by suitable interconnections in the hydraulic system for the carrier 22. Thus, at any time that the carrier 22 is carrying a pallet load 10 the operator cannot move the load at an excessively high or dangerous speed. Of course, this is a completely adjustable feature, and the system can be designed so that the pallet carrying speed of carrier 22 can be set at any desired speed from creep to the maximum speed which the carrier is capable of attaining.

Also, there is preferably built into the system interlocks so that the power to the carrier 22 is automatically cut off whenever either the host machine 16 is being moved along aisle A or the carriage 18 is being operated. With this safety feature, the carrier 22 cannot be operated unless the host machine 16 and its carriage 18 are both at rest. Similarly, interlocks are preferably provided to cut off the power to the controls for the host machine 16 at any time when the carrier 22 is in a position other than centered on the platform 20. This prevents the host machine 16 and the carriage 18 from being moved inadvertently whenever the carrier 22 has been dispatched. Of course, if the carrier 22 has been dispatched into an address of the storage rack and it becomes necessary to make an adjustment in the position of either the vertical or horizontal mode of the host machine 16, a switch can be provided to bypass the interlock and allow operation of the host machine 16 even though the carrier 22 is not on platform 20.

In order to guard against possible system or operator failure in operation of the vertical mode of the host machine 16 in which the carriage 18 is raised and lowered, limit switches (not shown) can be mounted on the frame structure 108 to bring the carriage 18 to a complete stop when the maximum travel limits have been reached. Also, physical stops (not shown) just beyond the limit switches can provide a final stop in the event of failure of the limit switches.

One of the characteristics of hydraulic operation as employed in both the host machine 16 and the carrier 22 is that if either vehicle comes against a physical stop and the drive system is not shut off, there will be no damage to the components or the vehicle itself. This is not true of electro-mechanical systems. Also, use of shock absorbers 96 on the carrier 22 will prevent damage either to the carrier 22 or pallet load 10 it is carrying if a system failure or operator negligence results in failure to stop the carrier 22 before it strikes another load 10.

From the foregoing description, it is evident that the invention provides improved flexibility and efficiency in pallet load handling without sacrifice of storage efficiency. This is accomplished without a substantial increase in cost and in some cases a reduction in cost over known automated high rise storage systems. The use of a single carrier dispatched and deriving its power and control from the host machine greatly reduces the cost over prior art systems in which multiple carriers must each derive their power from power rails located in each address of the storage rack. The system of the invention also eliminates the hazards of providing electrical power rails within the storage rack itself. The system of the invention either can be operated manually by an operator riding the host machine or can be remotely controlled. As an aid to the operator, or in remote control applications, the closed loop operation made possible by the control-power belt allows additional refinements to be employed to determine the exact position of the carrier 22 in any particular address of the storage rack. For example, means can be provided to sense the number of turns of the belt 38 on the reel 76, which information can be sent back through the belt 38 to determine the position of the carrier 22 and also to slow it down as it approaches predetermined limits. Also, limit switches can be provided on the carrier 22 itself to sense when the carrier has reached a pallet load 10. In such a case, a first limit switch can be used to slow the unit down with a second limit switch at the opposite end of the carrier being used to stop the carrier when it is properly positioned beneath a pallet load 10.

It will be evident to those in the materials handling field that the basic principles of the invention can be applied in a wide variety of storage systems including those employing gravity flow storage racks. Also the carrier can be used for warehouse maintenance by carrying a vacuum means into each address of the lowest tier to clean the floor of the warehouse. It will be further evident that the system can be applied to presently existing storage systems with a minimum of modification and expense. Many other variations and refinements can be made in the preferred embodiment disclosed herein in order to adapt the system to any particular installation or use. It is my intention, however, that all such revisions, variations, modifications as are obvious to those skilled in the art are within the spirit and scope of the invention and are therefore included within the scope of the following claims:

I claim:

1. A material storage and handling system for loads stored in multiple-tier, multiple-lane load supporting racks having an aisle extending along the faces of said racks, each address of said racks having an entrance end and a discharge end with a plurality of storage stations there between, said system comprising a vehicle movable along said aisle from lane to lane of said racks, said racks includes a pair of parallel rails that are horizontally spaced apart and extended from the entrance end to the discharge end of the address, the upper surface of said rails supporting the load stored in said racks, and said rails having a surface below said upper surface upon which said carrier is supported and moves, a vertically movable carriage on said vehicle movable between the lowest and highest of said tiers, a source of power for said vehicle, a load transporting carrier adapted for movement between storage stations along any selected one of said rack addresses, load lifting means on said carrier movable between a first lowered position in which said carrier can pass beneath a load supported by said racks in one of the storage stations and a second raised position in which a load engaged by said lifting means is raised above a supporting position on said racks, power means on board said carrier to provide for controlled movement of said carrier, support means on the vertically movable carriage of said vehicle for receiving said load transporting carrier from or dispatching it into an address of said racks and for supporting and carrying said carrier either with or without a load, and a flexible control-power member interconnecting said vehicle and said carrier to supply power and control functions for said carrier.

2. The material storage and handling system of claim 1 in which said carrier has a main rectangular-shaped body, and there is at least one wheel rotatably mounted near the front and near the rear along each side of the body, said wheels all being power-driven wheels.

3. The material storage and handling system of claim 1 in which said carrier is provided with a reel mounted for rotation on a vehicle axis beneath the carrier, said control-power member being wound on said reel, and power means is provided to drive said said to maintain tension constantly on said member.

4. The material storage and handling system of claim 3 in which said reel is driven in one direction only, and there are a pair of idlers adjacent said reel, one mounted toward the front and one toward the rear of said carrier, one of aid idlers being engagable with said control-power member at all times dpending upon the direction of movement from said vehicle.

5. The material storage and handling system of claim 3 in which the power means driving said reel is hydraulic and said hydraulic power means maintains a constant pressure on said reel so as to maintain the tension on said control-power member.

6. The material storage and handling system of claim 1 in which said carrier is mounted on a plurality of wheels, said control-power member includes a plurality of electrical leads, the power means on board said carrier includes a main electric motor and a variable volume hydraulic pump driven by said motor, and there are a plurality of hydraulic motors one for each of said wheels, said hydraulic motors being supplied by said pump to drive said wheels.

7. The material storage and handling system of claim 6 in which said carrier is provided with a reel mounted for rotation on a vertical axis beneath the carrier, said carrier-power member being wound on said reel, and hydraulc power means is provided to drive said reel to maintain tension constantly on said member, said hydraulic power means being supplied by said variable volume hydraulic pump.

8. The material storage and handling system of claim 6 in which the load lifting means on said carrier is hydraulically powered and supplied by said variable volume hydraulic pump.

9. The material storage and handling system of claim 1 in which said vehicle includes an operator's station said operator's station having manually operated controls for controlling movement of said vehicle, said vertically movable carriage and said carrier.

10. The material storage and handling system of claim 9 in which said operator's station is connected to and movable with said vertically movable carriage.

11. The material storage and handling system of claim 1 in which the support means on the vertically movable carriage is adapted to receive or dispatch said carrier either direction transversely to the direction of movement of said vehicle.

12. The material storage and handling system of claim 1 in which the support means on the vertically movable carriage includes a platform having parallel spaced-apart members corresponding to the size and spacing of the rails in each address of the racks, said spaced-apart members being adapted to receive or dispatch said carrier either direction transversely to the direction of movement of said vehicle.

13. The material storage and handling system of claim 2 in which the supporting means on the vertically movable carriage includes a platform having parallel spaced-apart members corresponding to the size and spacing of the rails in each address of the racks, and said carrier has a pair of wheels near the front and near the rear along each side of the body, each pair being spaced apart along each side, the width of said members being such that the members can be positioned a distance from said rails that is less than the spacing between a pair of the wheels on said carrier.

14. The material storage and handling system of claim 1 in which said flexible control-power member is a flat belt and includes a plurality of electrical leads and a wear resistant covering over said leads.

* * * * *